(12) United States Patent
Vinogradov

(10) Patent No.: US 7,690,575 B2
(45) Date of Patent: Apr. 6, 2010

(54) IMAGING READER WITH ADAPTIVE ILLUMINATION AND ADAPTIVE RESOLUTION

(75) Inventor: Igor Vinogradov, Bay Shore, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 23 days.

(21) Appl. No.: 11/981,443

(22) Filed: Oct. 31, 2007

(65) Prior Publication Data

US 2009/0108074 A1 Apr. 30, 2009

(51) Int. Cl.
*G06K 7/10* (2006.01)
(52) U.S. Cl. .............................. 235/462.26; 235/462.42
(58) Field of Classification Search .............. 235/462.4, 235/462.26, 462.27, 462.07, 462.42
See application file for complete search history.

(56) References Cited

U.S. PATENT DOCUMENTS

| 5,649,026 | A | * | 7/1997 | Heins, III | 382/175 |
| 6,032,860 | A | * | 3/2000 | Brian | 235/454 |
| 6,036,095 | A | * | 3/2000 | Seo | 235/472.01 |
| 6,729,546 | B2 | * | 5/2004 | Roustaei | 235/462.45 |
| 7,387,247 | B2 | * | 6/2008 | Ito | 235/454 |
| 7,389,933 | B2 | * | 6/2008 | Wang | 235/462.48 |
| 2003/0164785 | A1 | * | 9/2003 | Canini et al. | 341/155 |
| 2006/0113386 | A1 | * | 6/2006 | Olmstead | 235/454 |
| 2008/0252985 | A1 | * | 10/2008 | Zhu et al. | 359/641 |

* cited by examiner

*Primary Examiner*—Michael G Lee
*Assistant Examiner*—Tabitha Chedekel

(57) ABSTRACT

Infrared light having a wavelength in a range from about 700 nm to about 760 nm, which is non-readily visible, illuminates indicia to be electro-optically read by default. Blue visible light having a wavelength in a range from about 430 nm to about 505 nm illuminates the indicia when high-density and/or low-contrast indicia are detected.

8 Claims, 3 Drawing Sheets

IMAGING READER WITH ADAPTIVE ILLUMINATION AND ADAPTIVE RESOLUTION

DESCRIPTION OF THE RELATED ART

Bar code symbols are formed from bars or elements, typically rectangular in shape, with a variety of possible widths, and spaced apart to form spaces or elements of various widths. The specific arrangement of the elements defines a desired sequence of characters represented by a symbol according to a set of rules and definitions specified by a code or symbology used. The relative size of the elements is determined by the type of coding used, as is the actual size of the elements. The number of elements per unit length or area represented by the symbol is referred to as a "density" of the symbol. The difference in reflectivity/scattering properties between the bars, which are typically black in color (low reflectivity), and the spaces, which are typically white in color (high reflectivity), is referred to as a "contrast" of the symbol. To encode the desired sequence of characters, a collection of the elements is concatenated together to form the complete bar code symbol, with each character being represented by its own corresponding group of the elements.

A number of different symbologies exists. One-dimensional symbols, particularly of the Universal Product Code (UPC) type, each having a linear row of bars and spaces spaced apart along one direction, typically are referred to as "low-density" symbols. Two-dimensional symbols, such as Code 39, which introduced the concept of vertically stacking a plurality of rows of bar and space patterns in a single symbol as described in U.S. Pat. No. 4,794,239, and PDF417, which increased the amount of data that can be represented or stored on a given amount of surface area as described in U.S. Pat. No. 5,304,786, are typically referred to as "high-density" symbols.

Both one- or two-dimensional symbols may have a "low-contrast" when the difference in the reflectivity/scattering properties between the bars and the spaces is small, e.g., when the colors of the bars and the spaces are similar, or when the symbol is printed with thermal ink, or may have a "high-contrast" when the difference in the reflectivity/scattering properties between the bars and the spaces is large, e.g., when the colors of the bars and the spaces are dissimilar, or when the symbol is not printed with thermal ink. Contrast level varies as a function of the wavelength of the light illuminating the symbol. A symbol printed with thermal ink is well detectable in white or red visible light, but is hardly detectable in infrared light having a high wavelength, e.g., 850 nm.

Both one- and two-dimensional symbols can be read by employing solid-state imagers in imaging readers. Imaging readers have been employed at point-of-transaction workstations in supermarkets, warehouse clubs, department stores, and other kinds of retailers for many years. Products to be purchased bear an identifying symbol. An operator slides or swipes the products past a window on the reader either from right to left, or from left to right, or in another stroke, in a "swipe" mode. Alternatively, the operator merely presents the symbol on the product to a central region of the window by holding the product momentarily steady in a "presentation" mode. The choice depends on operator preference or on the layout of the workstation.

The solid-state imager typically has a one- or two-dimensional array of cells or photosensors, also commonly referred to as pixels, which correspond to image elements or pixels in a field of view of the imager. Such an imager may include a one- or two-dimensional charge coupled device (CCD) or a complementary metal oxide semiconductor (CMOS) device and associated circuits for producing electronic signals corresponding to a one- or two-dimensional array of pixel information over a field of view. The imager further includes at least one imaging lens to focus light returning from the symbol onto the photosensors.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a symbol as, for example, disclosed in U.S. Pat. No. 4,613,895. It is common to provide a two-dimensional CCD with a 640×480 resolution commonly found in VGA monitors, although other resolution sizes are possible.

It is also known to mount an illuminator in the reader, especially when the reader is operated in low light or dark environments. The illuminator is operative to illuminate the symbol during the reading with illumination light directed through the window. The illumination light is provided by at least one light emitting diode (LED), and preferably a plurality of LEDs. Each LED emits the illumination light with a white, or preferably a red, color, typically in the visible light spectrum having a wavelength between about 620 nm and 675 nm. The red illumination light may be emitted continuously, or may be pulsed.

As advantageous as the use of white/red LEDs is in illuminating the symbols to be read, the white/red illumination light may be perceived to be too annoyingly bright to some operators or customers. During the swipe mode when the white/red LED is always on, the constant white/red illumination light may be unpleasant to some operators who are exposed to such bright white/red light for extended time periods during a work shift, thereby making the operators uncomfortable with such long term exposure to their eyes. When the white/red LED is pulsed, it is usually overdriven with a high drive current to produce an intensely bright white/red illumination light, again making the operators uncomfortable.

To counter such bright light, infrared LEDs having a wavelength of about 850 nm are known. However, their light is completely invisible, and symbols printed with thermal ink cannot be easily detected and read.

SUMMARY OF THE INVENTION

One feature of the present invention resides, briefly stated, in a reader for, and a method of, electro-optically reading indicia, especially one- or two-dimensional symbols. The reader could be embodied as a stationary or portable point-of-transaction workstation having a window and/or as a handheld reader having a window. In the case of the workstation, the symbol is swiped past, or presented to, the window and, in the case of the handheld reader, the reader itself is moved, and the window is aimed at the symbol. In the preferred embodiment, the workstation is installed in a retail establishment, such as a supermarket.

A one- or two-dimensional, solid-state imager having a resolution is mounted in the reader, and includes an array of image sensors or pixels and an imaging lens for focusing the light from the illuminated indicia onto the array of image sensors. The imager is operative for capturing light from a one- or two-dimensional symbol or target through the window over a field of view during the reading. Preferably, the array is a CCD or a CMOS array.

When the reader is operated in low light or dark environments, an illuminator is also mounted in the reader and illuminates the symbol during the reading with illumination light directed from at least one illumination light source, and preferably a plurality of illumination light sources, through the window. Each illumination light source is preferably a light emitting diode (LED). The image sensors capture light scattered from the indicia illuminated by the illuminator, and generate a signal corresponding the illuminated indicia. A controller or microprocessor is operative for processing the signal to read the illuminated indicia.

Rather than using white/red LEDs with their annoyingly bright, intense, illumination light, or completely invisible illumination light, as described above, one aspect of this invention proposes illuminating the indicia with "non-readily visible" illumination light emitted by an energizable first light source when energized, and/or visible illumination light emitted by an energizable second light source when energized. The controller energizes at least one of the light sources to emit the respective illumination light to the illuminated indicia for capture by the imager. The term "non-readily visible" signifies that the illumination light is on the borderline of being visible.

In a preferred embodiment, the first light source is an infrared LED for emitting the non-readily visible illumination light as infrared light having a wavelength in a range from about 700 nm to about 760 nm. The second light source is a blue LED for emitting the visible illumination light as blue light having a wavelength in a range from about 430 nm to about 505 nm.

The controller is operative for energizing the infrared LED, preferably continuously, in a default mode. The non-readily visible infrared light is very dim to the human eye. This alleviates the prior art problem of an annoyingly bright, intense illumination light bothering the operator, or a completely invisible light that cannot read certain symbols. The non-readily visible infrared light can still provide sufficient illumination for the array of image sensors to capture light from some symbols, such as low-density and/or high-contrast symbols, and produce a signal that can be processed and successfully read.

However, the longer wavelength of the infrared light, as compared to the wavelength of the conventional red light, increases crosstalk between adjacent image sensors or pixels in the array and effectively reduces the resolution of the overall imager. Resolution of a diffraction-limited imaging lens is dependent on the wavelength of the light imaged through the lens. Light of a longer wavelength tends to focus to a larger spot as compared to light of a shorter wavelength. Both these factors reduce the modulation transfer function (MTF) of the reader and reduce overall reader performance.

To counter the reduced MTF, the controller is operative for determining a density and/or contrast between the elements of the illuminated indicia, and for energizing the blue LED only when the density determined by the controller is at least equal to, and preferably exceeds, a reference density value and/or when the contrast determined by the controller is below a reference contrast value. The blue light is highly visible and, hence, its use is restricted by energizing the blue LED only for a brief time interval and only when the blue illumination light is needed to enable the array to capture light from high-density and/or low-contrast symbols, thereby producing a signal that can be processed and successfully read. The blue light produces the highest MTF and increases the resolution of the imager.

Another feature of the present invention resides in a method of electro-optically reading indicia, comprising the steps of illuminating the indicia during reading, by emitting non-readily visible illumination light from an energizable first light source when energized, and by emitting visible illumination light from an energizable second light source when energized; capturing light scattered from the illuminated indicia over a field of view of a solid-state imager including an array of image sensors during reading, and generating a signal corresponding to the illuminated indicia; and energizing at least one of the light sources to emit the illumination light to the illuminated indicia for capture by the imager, and processing the signal to read the illuminated indicia.

Preferably, the first light source is configured as an infrared LED for emitting the non-readily visible illumination light as infrared light having a wavelength in a range from about 700 nm to about 760 nm, and the second light source is configured as a blue LED for emitting the visible illumination light as blue light having a wavelength in a range from about 430 nm to about 505 nm.

The method includes the steps of determining a density and/or contrast between elements of the illuminated indicia, and energizing the blue LED only when the density determined by the controller is at least equal to, and preferably exceeds, a reference density value and/or when the contrast determined by the controller is below a reference contrast value. The infrared LED is continuously energized in a default mode so as not to make the operator uncomfortable to bright light, and the blue LED is energized only for a brief time interval and only when needed to enable high-density and/or low-contrast symbols to be read.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
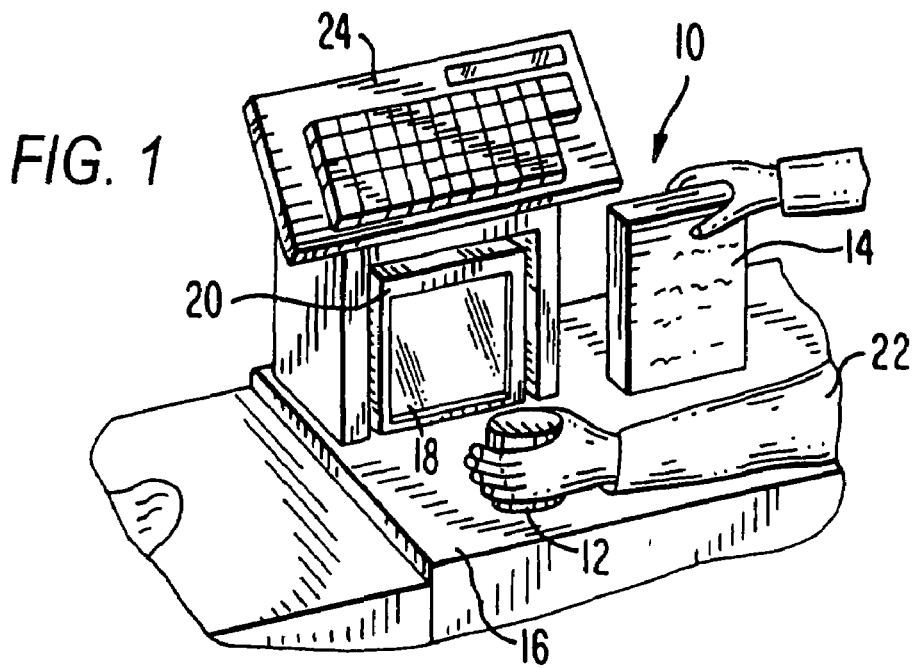
FIG. 1 is a perspective view of an electro-optical imaging reader at a point-of-transaction workstation operative for capturing light from symbol-bearing targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a generally vertical window 18 or presentation area of a box-shaped vertical imaging reader 20 mounted on the countertop 16. A checkout clerk or operator 22 is located at one side of the countertop, and the reader 20 is located at the opposite side. A cash/credit register 24 is located within easy reach of the operator.

Figure 2:
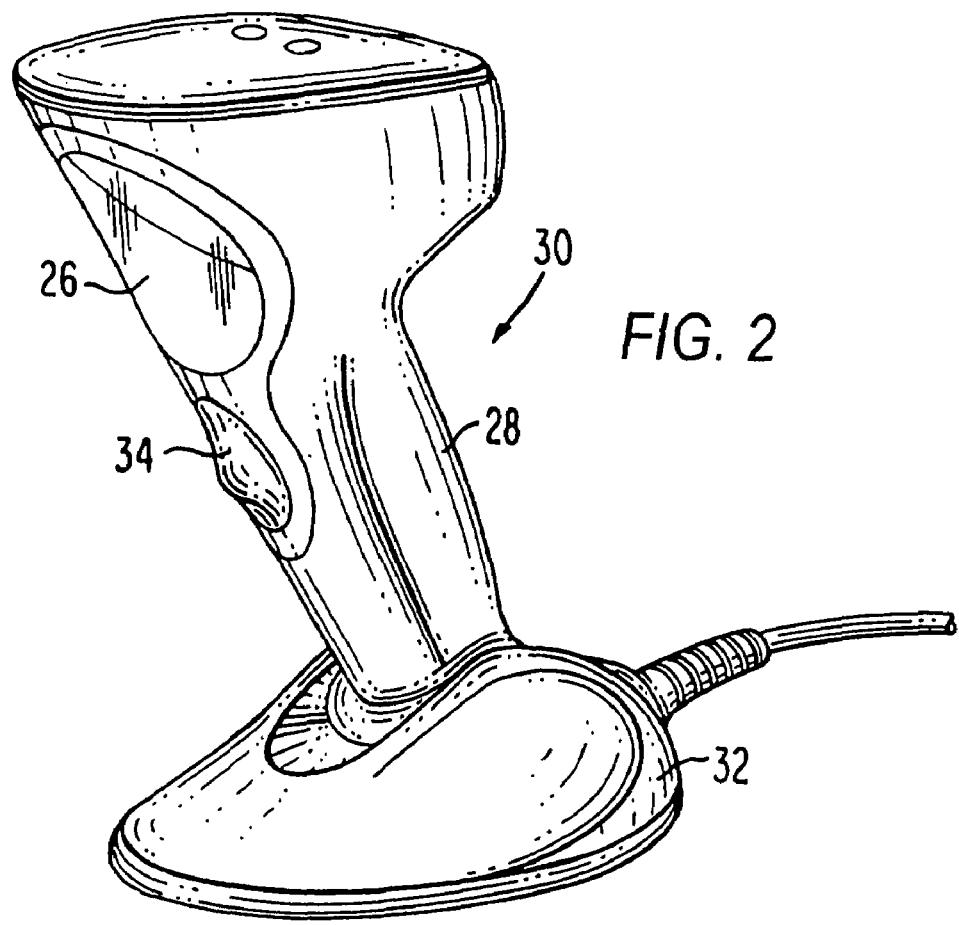
FIG. 2 is a perspective view of an electro-optical imaging reader operative in either a hand-held mode, or a workstation mode, for capturing light from symbol-bearing targets in accordance with this invention.

Reference numeral 30 in FIG. 2 generally identifies another imaging reader having a different configuration from that of reader 20. Reader 30 also has a generally vertical window 26 or presentation area, and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

Figure 3:
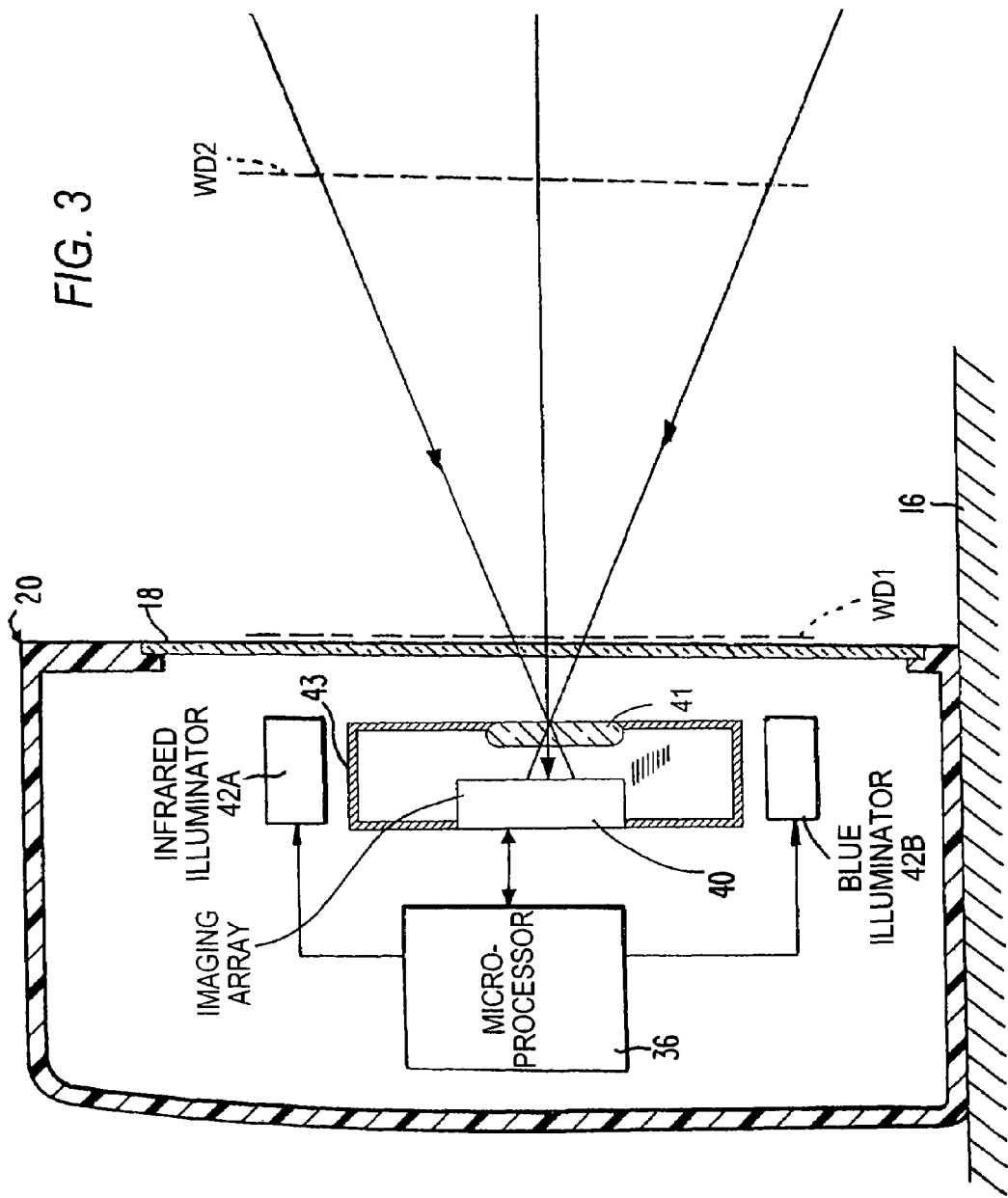
FIG. 3 is a block diagram of various components of the reader of FIG. 1.

As schematically shown in FIG. 3, an imager 40 and an imaging lens 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, either low- or high-density, either low- or high-contrast, over a field of view, and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. Although the aforementioned imaging lens 41 is depicted as a single lens, this was done to simplify the drawing. In practice, the lens 41 includes a plurality of optical lenses arranged along an optical path to focus the illumination light from the indicia onto the imager.

An illuminator is also mounted in the reader and preferably includes a plurality of energizable light sources, e.g., light emitting diodes (LEDs) 42A, 42B, as described in further detail below, arranged to uniformly illuminate the target. The imager 40 and the illuminator LEDs 42A, 42B are operatively connected to a controller or microprocessor 36 operative for controlling the operation of these components. Preferably, the microprocessor is the same as the one used for processing an electrical signal generated by the imager from the captured target images, and for decoding the electrical signal into data descriptive of, or relating to, the target symbol.

In operation, the microprocessor 36 sends a command signal to energize the illuminator LEDs 42A, 42B either continuously or for a short time period, say 5 milliseconds or less, and energizes the imager 40 to collect light from a target symbol only during said time period. A typical array needs about 33 milliseconds to read the entire target image and operates at a frame rate of about 30 frames per second. The array may have on the order of one million addressable image sensors.

In the prior art, white/red LEDs, as described above, with their annoyingly bright, intense, illumination light, or infrared LEDs with their completely invisible, illumination light, were employed for the illuminator. In accordance with one aspect of this invention, the LED 42A illuminates the indicia with "non-readily visible" illumination when energized by the controller 36, and the LED 42B illuminates the indicia with visible illumination light when energized by the controller 36. The term "non-readily visible" signifies that the illumination light is on the borderline of being visible.

In a preferred embodiment, the LED 42A is an infrared LED for emitting the non-readily visible illumination light as infrared light having a wavelength in a range from about 700 nm to about 760 nm. The LED 42B is a blue LED for emitting the visible illumination light as blue light having a wavelength in a range from about 430 nm to about 505 nm.

The controller 36 is operative for energizing the infrared LED 42A, preferably continuously, in a default mode. The non-readily visible infrared light is very dim to the human eye. This alleviates the prior art problem of an annoyingly bright, intense illumination light bothering the operator. The non-readily visible infrared light can still provide sufficient illumination for the array 40 of image sensors to capture light from some symbols, such as low-density and/or high-contrast symbols, and produce a signal that can be processed and successfully read.

However, the longer wavelength of the infrared light, as compared to the wavelength of the conventional red light, increases crosstalk between adjacent image sensors in the array 40 and reduces the overall resolution of the imager. Both these factors reduce the modulation transfer function (MTF) of the reader and reduce overall reader performance.

To counter the reduced MTF, the controller 36 is operative for determining a density and/or contrast between the elements of the illuminated indicia, and for energizing the blue LED 42B only when the density determined by the controller 36 is at least equal to, and preferably exceeds, a reference density value and/or when the contrast determined by the controller 36 is below a reference contrast value. The blue light is highly visible and, hence, its use is restricted by energizing the blue LED 42B only for a brief time interval and only when the blue illumination light is needed to enable the array 40 to capture light from high-density and/or low-contrast symbols, thereby producing a signal that can be processed and successfully read. The blue light produces the highest MTF and increases the resolution of the imager.

The controller 36 preferably continuously energizes the infrared LED 42A by default, but could also pulse the infrared LED 42A. By default, the blue LED 42B would be deenergized. If a high-density symbol, such as a two-dimensional symbol, or if a low-contrast symbol, such as one printed with thermal ink, is detected by the controller 36, then the controller 36 preferably deenergizes the infrared LED 42A and pulses the blue LED 42B, but could also continuously energize the blue LED 42B. In some applications, both the infrared LED 42A and the blue LED 42B could be simultaneously energized.

There are several different types of high-density targets, which have particular utility for the enhancement of the operation of the reader. The target may be a personal check, a credit card, or a debit card presented by a customer for payment of the products being purchased. The operator need only swipe or present these high-density targets in close proximity to the window 16 for image capture.

The high-density target may also be a signature, a driver's license, or the consumer himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. The target may, of course, be two-dimensional symbols whose use is becoming more widespread, especially in manufacturing environments and in package delivery. Sometimes, the target includes various lengths of truncated symbols of the type frequently found on frequent shopper cards, coupons, loyalty cards, in which case the imager can also read these additional symbols.

Figure 4:
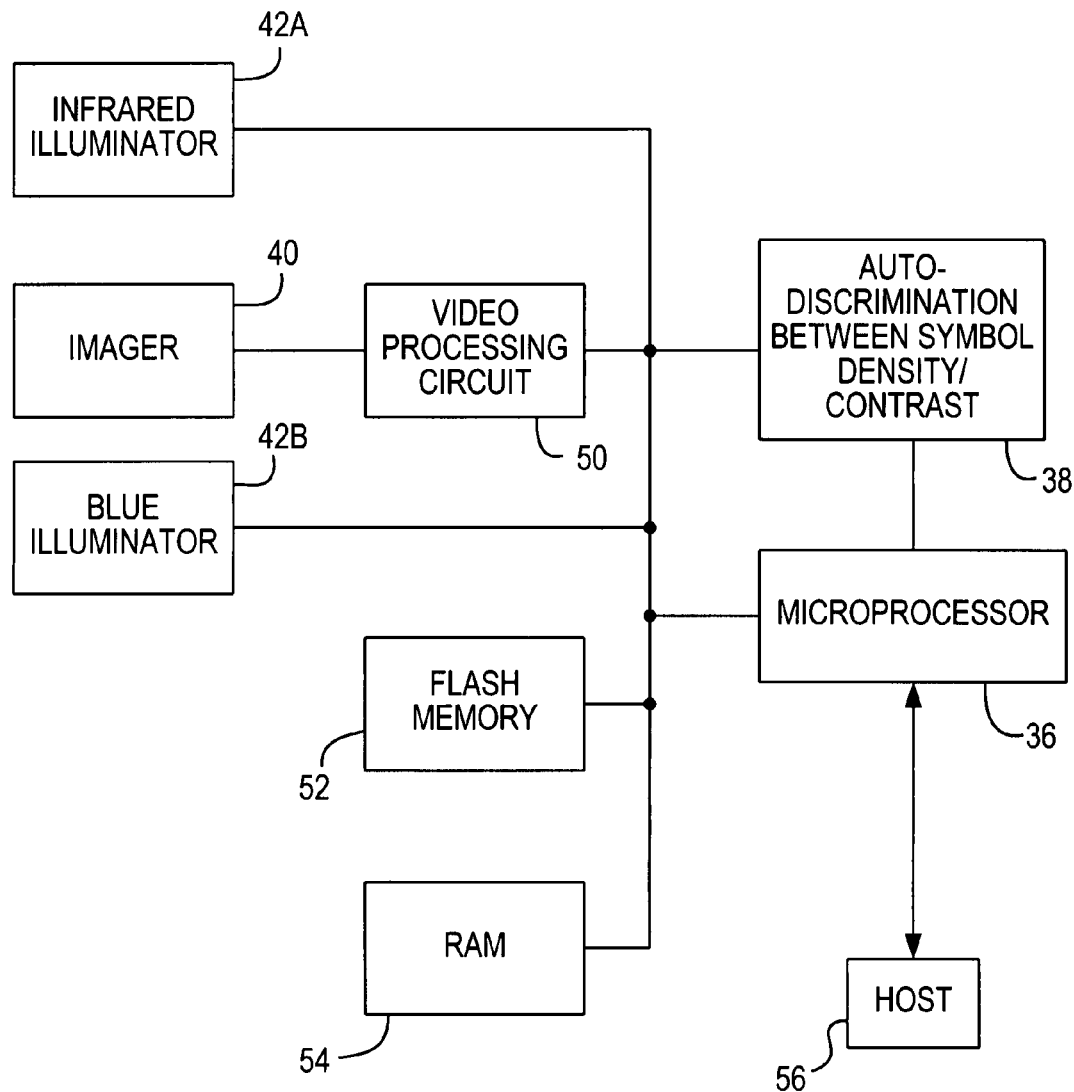
FIG. 4 is a block diagram of electrical circuitry employed with the imager and other reader components in accordance with this invention.

A continuous video stream generated during a continuous image acquisition mode can, however, overload a conventional video processing circuit and, as a result, cause some frames of the target image to be dropped. A high-speed video processing circuit 50, as shown in FIG. 4, receives the continuous video stream from the imager 40 and, with the aid of an auto-discrimination circuit 38, determines and selects which images in the stream are low-density one-dimensional symbols, which images are high-density two-dimensional symbols, which images are low-contrast symbols, and which images are high-contrast symbols. The auto-discrimination circuit 38, after such selection, transfers only the symbols to the microprocessor 36 for decoding. The auto-discrimination function can also be implemented in the microprocessor. The software to be downloaded to the auto-discrimination circuit 38 is stored in the flash memory 52. This dramatically reduces the computational burden on the microprocessor 36. The other images can be directly transferred to a memory, such as RAM 54, or directly routed by the microprocessor to a host 56. The method used for auto-discrimination between one- and two-dimensional symbols is described in U.S. Pat. No. 6,250,551, the entire contents of which are incorporated herein by reference thereto.

It will be understood that each of the elements described above, or two or more together, also may find a useful application in other types of constructions differing from the types described above. Thus, readers having different configurations can be used.

While the invention has been illustrated and described as an imaging reader with an adaptive illumination and with an adaptive resolution, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A reader for electro-optically reading indicia, comprising:
    an illuminator for illuminating the indicia during reading, the illuminator including an energizable first light source for emitting non-readily visible illumination infrared light having a wavelength in a range from about 700 nm to about 760 nm when energized, and an energizable second light source for emitting visible illumination blue light having a wavelength in a range from about 430 nm to about 505 nm when energized;
    a solid-state imager including an array of image sensors for capturing light scattered from the indicia illuminated by the illuminator over a field of view during reading, and for generating a signal corresponding the illuminated indicia; and
    a controller for energizing at least one of the light sources to emit the illumination light to the illuminated indicia for capture by the imager, and for processing the signal to read the illuminated indicia, wherein the controller is operative for continuously energizing the first light source in a default mode, and for energizing the second light source only for a time interval to increase a spatial resolution of the imager when a density determined by the controller equals or exceeds a reference density value.

2. The reader of claim 1, and a housing for supporting the illuminator and the imager, and wherein the housing has a handle for handheld operation and a window through which the illumination light passes.

3. The reader of claim 1, and a housing for supporting the illuminator and the imager, and wherein the housing has a base for supporting the housing on a support surface for workstation operation and a window through which the illumination light passes.

4. A method of electro-optically reading indicia, comprising the steps of:
    illuminating the indicia during reading, by emitting non-readily visible illumination infrared light having a wavelength in a range from about 700 nm to about 760 nm from an energizable first light source when energized, and by emitting visible illumination blue light having a wavelength in a range from about 430 nm to about 505 nm from an energizable second light source when energized;
    capturing light scattered from the illuminated indicia over a field of view of a solid-state imager including an array of image sensors during reading, and generating a signal corresponding the illuminated indicia; and
    energizing at least one of the light sources to emit the illumination light to the illuminated indicia for capture by the imager, and processing the signal to read the illuminated indicia, wherein the energizing step is performed by continuously energizing the first light source in a default mode, and by energizing the second light source only for a time interval to increase a spatial resolution of the imager when a determined density equals or exceeds a reference density value.

5. The method of claim 4, and supporting the illuminator and the imager with a housing, and providing a handle on the housing for handheld operation, and providing a window on the housing for passing the illumination light.

6. The method of claim 4, and supporting the illuminator and the imager with a housing, and providing a base on the housing for supporting the housing on a support surface for workstation operation, and providing a window on the housing for passing the illumination light.

7. A reader for electro-optically reading indicia, comprising:
    an illuminator for illuminating the indicia during reading, the illuminator including an energizable first light source for emitting non-readily visible illumination light when energized, and an energizable second light source for emitting visible illumination light when energized;
    a solid-state imager having a resolution and including an array of image sensors for capturing light scattered from the indicia illuminated by the illuminator over a field of view during reading, and an imaging lens for focusing the light from the illuminated indicia onto the array of image sensors, the imager being operative for generating a signal corresponding to the illuminated indicia; and
    a controller for energizing at least one of the light sources to emit the illumination light to the illuminated indicia for capture by the imager, and for processing the signal to read the illuminated indicia, wherein the controller is operative for continuously energizing the first light source in a default mode, and for energizing the second light source only for a time interval to increase a spatial resolution of the imager when a contrast determined by the controller equals or is below a reference contrast value.

8. A method of electro-optically reading indicia, comprising the steps of:

illuminating the indicia during reading, by emitting non-readily visible illumination light from an energizable first light source when energized, and by emitting visible illumination light from an energizable second light source when energized;

capturing light scattered from the illuminated indicia over a field of view of a solid-state imager including an array of image sensors during reading, focusing the light from the illuminated indicia onto the array of image sensors, and generating a signal corresponding the illuminated indicia; and energizing at least one of the light sources to emit the illumination light to the illuminated indicia for capture by the imager, and processing the signal to read the illuminated indicia, wherein the energizing step is performed by continuously energizing the first light source in a default mode, and by energizing the second light source only for a time interval to increase a spatial resolution of the imager when a determined contrast equals or is below a reference contrast value.

* * * * *